(12) United States Patent
Fujinami et al.

(10) Patent No.: US 8,993,652 B2
(45) Date of Patent: Mar. 31, 2015

(54) DUAL-CURE CURABLE MATERIAL KIT

(75) Inventors: Kyoichi Fujinami, Tokyo (JP); Kazuhiko Okishio, Tokyo (JP)

(73) Assignee: Tokuyama Dental Corporation, Tokyo (JP)

( * ) Notice: Subject to any disclaimer, the term of this patent is extended or adjusted under 35 U.S.C. 154(b) by 447 days.

(21) Appl. No.: 13/257,855

(22) PCT Filed: Dec. 8, 2009

(86) PCT No.: PCT/JP2009/070526
§ 371 (c)(1),
(2), (4) Date: Sep. 20, 2011

(87) PCT Pub. No.: WO2010/067790
PCT Pub. Date: Jun. 17, 2010

(65) Prior Publication Data
US 2012/0059079 A1   Mar. 8, 2012

(30) Foreign Application Priority Data
Dec. 11, 2008   (JP) ................. 2008-316179

(51) Int. Cl.
*A61L 24/06* (2006.01)
*C08J 3/28* (2006.01)
*C08F 20/06* (2006.01)
*C08F 2/50* (2006.01)
*C08F 4/32* (2006.01)
*C08F 220/36* (2006.01)

(52) U.S. Cl.
CPC ... *C08F 4/32* (2013.01); *C08F 2/50* (2013.01); *C08F 220/36* (2013.01); *Y10S 522/908* (2013.01)
USPC ........... 523/115; 523/105; 523/109; 523/116; 523/117; 522/47; 522/48; 522/51; 522/57; 522/60; 522/61; 522/64; 522/908; 522/178; 522/182

(58) Field of Classification Search
USPC ........... 523/115, 105, 109, 116, 117; 522/47, 522/48, 51, 57, 60, 61, 64, 65, 908
See application file for complete search history.

(56) References Cited

U.S. PATENT DOCUMENTS 3,954,475 A * 5/1976 Bonham et al. ............ 430/281.1
4,071,424 A * 1/1978 Dart et al. ..................... 522/14
6,964,985 B2 * 11/2005 Karim et al. ................. 523/115

FOREIGN PATENT DOCUMENTS

| JP | 61-186303 | 8/1986 |
|---|---|---|
| JP | 02-017155 | 1/1990 |
| JP | 07-196431 | 8/1995 |
| JP | 63-273602 | 11/1998 |
| JP | 2005-076022 | 3/2005 |
| JP | 2005-089729 | 4/2005 |
| JP | 2005-170813 | 6/2005 |
| JP | 2006076973 A * | 3/2006 |
| WO | WO 2009073570 A2 * | 6/2009 |

* cited by examiner

*Primary Examiner* — Sanza McClendon
(74) *Attorney, Agent, or Firm* — Norris McLaughlin & Marcus P.A.

(57) ABSTRACT

A dual-cure curable material kit comprising: (A) a radical-polymerizable monomer component; (B) a photopolymerization initiator component comprising (b1) an α-diketone compound, (b2) an aliphatic tertiary amine compound having a tertiary amino group in which three saturated aliphatic groups are bonded to a nitrogen atom and one of the saturated aliphatic groups has an electron-withdrawing group as a substituent, and (b3) an s-triazine compound having a trihalomethyl group as a substituent, or a diaryliodonium salt compound; and a chemical polymerization initiator component (C) comprising (c1) an organic peroxide, and (c2) an N,N-di(hydroxyalkyl)-p-toluidine compound; which is packed separately at least in two packages so that the component (b2) and the component (b3) of the photopolymerization initiator component (B) are not packed together in a single package and the component (c1) and the component (c2) of the chemical polymerization initiator component (C) are not packed together in a single package.

7 Claims, No Drawings

DUAL-CURE CURABLE MATERIAL KIT

TECHNICAL FIELD

The present invention relates to a dual-cure curable material kit which contains a chemical polymerization initiator and a photopolymerization initiator and shows good curing characteristic. The present dual-cure curable material kit can be preferably used as, for example, a dental restoration material.

BACKGROUND ART

Dental resin composite is a composite material composed mainly of a polymerizable monomer, a polymerization initiator and a filler. Dental resin composite can be imparted a color equivalent to natural tooth color and is easy to handle in the restoration operation of tooth; therefore, it is in wide use as a material for tooth restoration recently.

The application site of dental resin composite is various and includes, for example, shallow cavity where esthetics is required, the whole portion of tooth crown to be restored, and deep cavity (e.g. root canal after pulpectomy) where the light of dental light applicator does not reach. Rebuilding of abutment tooth, for example, is conducted to the root canal after pulpectomy.

Of the above-mentioned restoration sites, the shallow cavity where esthetics is required, is a site which is exposed to gaze of other persons. In the restoration of such a site, there is ordinarily used a dental resin composite containing a photopolymerization initiator. The photopolymerization initiator allows polymerization to start upon light application. The photo-curing dental resin composite containing a photopolymerization initiator does not allow polymerization to start unless light application is made. Accordingly, light-curing dental resin composite, even when all components are mixed in a single paste, can be produced and stored under light shading.

In contrast, when a deep cavity (e.g. root canal after pulpectomy) is restored, no sufficient light reaches to the restoration site. As a result, the photopolymerization initiator does not function sufficiently and the dental resin composite is not polymerized sufficiently. Accordingly, the cured material obtained is inferior in various properties including mechanical strength.

In order to solve this problem, a so-called chemical polymerization initiator has been mainly compounded in dental resin composite. This chemical polymerization initiator is composed of two or more polymerization initiator components and, when these components are allowed to contact with each other, a polymerization-initiating species is generated (even at room temperature). Accordingly, a chemical-curing type dental resin composite is produced and stored being divided into two portions (ordinarily, two pastes). The dental resin composite stored being divided in two portions is mixed right before the use of the resin composite.

As explained above, the photo-curing type resin composite or the chemical-curing type resin composite is used depending upon the application purpose. However, there are many cases where a resin composite having both photo-curing characteristic and chemical-curing characteristic is convenient depending upon the application condition.

For example, there is a case where a resin composite is filled in a deep cavity (e.g. root canal after pulpectomy) and cured, an abutment for crown bridge is constructed using a curing material having the same formulation as the resin composite, and then the preparation form of abutment tooth is corrected using a grinding tool. In this case, a single resin composite is used easily, which shows good chemical-curing characteristic in a deep cavity and shows photo-curing characteristic so as to enable efficient and easy rebuilding of abutment. As the resin composite for such an application, there is a resin composite in which a photopolymerization initiator is compounded in a chemical-curing resin composite and which has both of chemical-curing characteristic and photo-curing characteristic (see, for example, Patent Literatures 1 and 2). This resin composite is so called "dual-cure resin composite".

Next, the photopolymerization initiator compounded in a photo-curing resin composite is focused. In this case, there is required a photopolymerization initiator which allows for no curing under a weak light (e.g. an environmental light) and allows a resin composite to cure rapidly when a strong light is applied by, for example, a light applicator. As the photopolymerization initiator meeting this requirement, there is proposed a photopolymerization initiator system in which an α-diketone compound, an s-triazine compound having a trihalomethyl group as a substituent, and an aliphatic tertiary amine compound are combined (see, for example, Patent Literatures 3 and 4). This photopolymerization initiator has very high polymerization activity.

When this photopolymerization initiator is irradiated with a light, energy level of the α-diketone compound is excited, the excited energy of the α-diketone compound is transferred to the s-triazine compound, thereby a radical contributing to polymerization is generated. In this case, the co-presence of the aliphatic tertiary amine compound makes easy the presence of activated s-triazine compound. As a result, the amount of radical generated increases greatly, exhibiting high polymerization activity.

In the above photopolymerization initiator, the aliphatic tertiary amine compound imparts, to the s-triazine compound, higher polymerization activity than a primary amine compound or a secondary amine compound. Of various aliphatic tertiary amine compounds, an aliphatic tertiary amine compound in which at least two of the three saturated aliphatic groups bonding to the nitrogen atom have an electroattracting group as a substituent, imparts high storage stability to a resin composite and therefore is extremely useful (Patent Literature 4, paragraph 0030).

Further, it is known to use, as the polymerization initiator component, an aryliodonium salt, a sensitizer and an electron donor (e.g. Patent Literature 6).

Meanwhile, it is necessary to focus also on the chemical polymerization initiator contained in a chemical-curing type resin composite. As a chemical polymerization initiator showing a high activity, there is known a system in which an organic peroxide is reacted with an aromatic tertiary amine compound in which the nitrogen atom is directly bonded to the aromatic group, to generate a polymerization-activating species (e.g. Patent Literature 5, paragraph 0020).

An investigation by the present inventors revealed that when, in the above system of chemical polymerization initiator, an N,N-di(hydroxyalkyl)-p-toluidine compound is used as the aromatic tertiary amine compound in which the nitrogen atom is directly bonded to the aromatic group, the dental resin composite obtained shows a very favorable property. That is, it was revealed that, in using the dental resin composite obtained, there is an appropriate time from the timing of mixing the p-toluidine compound with the organic peroxide to the timing of generation of polymerization-initiating species and, once the polymerization-initiating species begins to generate, the generation amount increases rapidly and the polymerization is complete in a short time.

That there is an appropriate time (ordinarily 2 to 10 minutes) from the timing of mixing the organic peroxide with the amine compound to the timing of generation of polymerization-initiating species, means that, in dental treatment, a sufficient time can be secured in filling operation of resin composite. As a result, a dentist can conduct treatment with afford. Further, that once the polymerization-initiating species begins to generate, the generation amount increases rapidly, means that the resin composite filled can be cured in a short time.

Patent Literature 1: JP61-186303 A
Patent Literature 2: JP2005-170813 A
Patent Literature 3: JP2005-76022 A
Patent Literature 4: JP2005-89729 A
Patent Literature 5: JP7-196431 A
Patent Literature 6: JP63-273602 A

DISCLOSURE OF INVENTION

Technical Problem

The present inventors attempted to compound a photopolymerization initiator into a chemical-curing resin composite containing a chemical polymerization initiator, to develop a dual-cure type resin composite. The chemical cure type resin composite used had contained a chemical polymerization initiator comprising an organic peroxide and an N,N-di(hydroxyalkyl)-p-toluidine compound, which has a high activity and enables excellent operation as mentioned previously. As the photopolymerization initiator, there was used a combined system of an α-diketone compound, an s-triazine compound having a trihalomethyl group as a substituent or an aryliodonium salt, and an aliphatic tertiary amine compound in which at least two of three saturated aliphatic groups bonding to the nitrogen atom have an electroattracting group as a substituent (all these components were mentioned previously).

However, the resin composite prepared was unexpectedly low in the polymerization activity when exposed to a light, and was insufficient in curing characteristic for practical application.

The reason is not clear but the present inventors presume the reason as described below.

In the above-used highly active photopolymerization initiator, the activated s-triazine compound or aryliodonium salt is stabilized by the aliphatic tertiary amine compound, greatly increasing the amount of radical generated, as described previously. However, when the N,N-di(hydroxyalkyl)-p-toluidine compound contained in the chemical polymerization initiator is present together, the stabilization mechanism of the activated s-triazine compound or aryliodonium salt is hindered. As a result, the formation reaction of polymerization-activating species in photopolymerization initiator is reduced.

Under the above background, the present invention aims at providing a dual-cure resin composite which is high in both photo-curing characteristic and chemical-curing characteristic, can secure, regarding the chemical-curing characteristic, an appropriate time length up to the start of polymerization, shows, when polymerization starts, rapid and active polymerization and cures in a short time, and enables excellent operation.

Technical Solution

In order to achieve the above task, the present inventors made a further study on dual-cure resin composite.

As a result, the present inventor thought of using, as the aliphatic tertiary amine compound contained in a photopolymerization initiator, an amine compound in which an electroattracting group is bonded to only one of the three saturated aliphatic groups bonding to the nitrogen atom. By employing an amine compound having a particular chemical structure specified by the present invention, the activated s-triazine compound or aryliodonium salt can be stabilized even when the chemical polymerization initiator used contains an N,N-di(hydroxyalkyl)-p-toluidine compound. Also, an investigation was made on the package form of individual components. As a result of these investigations, the present inventors found that the above-mentioned problem could be solved. The finding has led to the completion of the present invention.

The present invention provides a dual-cure curable material kit comprising (A) a radical-polymerizable monomer component, (B) a photopolymerization initiator component comprising (b1) an α-diketone compound, (b2) an aliphatic tertiary amine compound having a tertiary amino group in which three saturated aliphatic groups bond to the nitrogen atom and one of the saturated aliphatic groups has an electroattracting group as a substituent, and (b3) an s-triazine compound having a trihalomethyl group as a substituent, or a diaryliodonium salt compound, and (C) a chemical polymerization initiator component comprising (c1) an organic peroxide and (c2) an N,N-di(hydroxyalkyl)-p-toluidine compound, which is packed in at least two different packages so that the component (b2) and the component (b3) both of the photopolymerization initiator component are not present together in a single package and the component (c1) and the component (c2) both of the chemical polymerization initiator component are not present together in a single package.

Advantageous Effects

The dual-cure curable material kit of the present invention is highly active in both chemical-curing characteristic and photo-curing characteristic. Further, as to the chemical-curing characteristic, an appropriate time length (ordinarily 2 to 10 minutes) can be secured from the time of mixing of individual packages constituting the kit to the start of polymerization; when polymerization starts, it becomes rapidly active and curing is complete in a short time. Accordingly, with the present dual-cure curable material kit, a sufficient handling time can be secured at the use site, providing excellent operation.

Further, in the chemical polymerization initiator compounded in the present dual-cure curable material kit, the organic peroxide (c1) and the N,N-di(hydroxyalkyl)-p-toluidine compound (c2) need to be packed separately in different packages in order to avoid the polymerization of the radical-polymerizable monomer before the use of the kit. Meanwhile, the individual components of the photopolymerization initiator need not be packed separately in different packages. However, since the (c1) and the (c2) both of the chemical polymerization initiator are packed separately, the (b2) and the (b3) both of the photopolymerization initiator can be also packed separately in the different packages of the chemical polymerization initiator, which further improves the storage stability of the present kit.

BEST MODE FOR CARRYING OUT THE INVENTION

The dual-cure curable material kit of the present invention comprises (A) a radical-polymerizable monomer component, (B) a photopolymerization initiator component comprising (b1) an α-diketone compound, (b2) an aliphatic tertiary amine compound having a tertiary amino group in which three saturated aliphatic groups bond to the nitrogen atom and one of the saturated aliphatic groups has an electroattracting group as a substituent, and (b3) an s-triazine compound having a trihalomethyl group as a substituent, or a diaryliodonium salt compound, and (C) a chemical polymerization initiator component comprising (c1) an organic peroxide and (c2) an N,N-di(hydroxyalkyl)-p-toluidine compound.

(A) Radical-polymerizable Monomer Component

As to the radical-polymerizable monomer used in the dual-cure curable material kit of the present invention, there is no particular restriction, and a known monomer can be used. A polymerizable monomer having no acidic group (e.g. sulfonic acid group, carboxyl group or phosphoric acid residue) is preferred because such a monomer is good in curing rate as well as in mechanical properties, water resistance, discoloration resistance, storage stability, etc. of cured material. As the radical-polymerizable group of the monomer, there can be mentioned acryloyl group, methacryloyl group, acrylamide group, methacrylamide group, vinyl group, allyl group, ethynyl group, styryl group, etc. Of these radical-polymerizable groups, preferred are acryloyl group and methacryloyl group.

The radical-polymerizable monomer is preferably a polyfunctional polymerizable monomer having a plurality of the above-mentioned radical-polymerizable groups, for higher mechanical strength of cured material, and more preferably a polyfunctional acrylate type or methacrylate type (they may be referred to as (meth)acrylate type) polymerizable monomer. Specific examples of the polyfunctional (meth)acrylate type polymerizable monomer include the compounds shown in the following (I) to (III).

(I) Bifunctional (meth)acrylate Type Polymerizable Monomer (i) Aromatic Compound Type Monomer 2,2-Bis[4-(3-methacryloyloxy-2-hydroxypropoxy)phenyl]propane, 2,2-bis(4-methacryloyloxyphenyl)propane, 2,2-bis(4-methacryloyloxypolyethoxyphenyl)propane, 2,2-bis(4-methacryloyloxydiethoxyphenyl)propane, 2,2-bis(4-methacryloyloxytetraethoxyphenyl)propane, 2,2-bis(4-methacryloyloxypentaethoxyphenyl)propane, 2,2-bis(4-methacryloyloxydipropoxyphenyl)propane, 2(4-methacryloyloxydiethoxyphenyl)-2(4-methacryloyloxytriethoxyphenyl)propane, 2(4-methacryloyloxydipropxyphenyl)-2(4-methacryloyloxytriethoxyphenyl)propane, 2,2-bis((4-methacryloyloxypropxyphenyl)propane, 2,2-bis(4-methacryloyloxyisopropoxyphenyl)propane, acrylates corresponding to the above methacrylates, diadducts obtained by the addition reaction between OH group-containing (meth)acrylate type polymerizable monomer and aromatic group-containing diisocyanate compound, etc.

Incidentally, examples of the OH group-containing (meth)acrylate type polymerizable monomer include methacrylates such as 2-hydroxyethyl methacrylate, 2-hydroxypropyl methacrylate, 3-chloro-2-hydroxypropyl methacrylate and the like; and acrylates corresponding to these methacrylates. Examples of the above diisocyanate include diisocyanato methylbenzene and 4,4'-diphenylmethane diisocyanate.

(ii) Aliphatic Compound Type Monomer 1,2-Bis(3-methacryloyloxy-2-hydroxypropoxy)ethane, ethylene glycol dimethacrylate, diethylene glycol dimethacrylate, triethylene glycol dimethacrylate, tetraethylene glycol dimethacrylate, neopentyl glycol dimethacrylate, 1,3-butanediol dimethacrylate, 1,4-butanediol dimethacrylate, 1,6-hexanediol dimethacrylate, acrylates corresponding to these methacrylates, diadducts obtained by the addition reaction between OH group-containing (meth)acrylate type polymerizable monomer and aliphatic diisocyanate compound, etc.

As examples of the above OH group-containing (meth)acrylate type polymerizable monomer, there can be mentioned the same monomers as mentioned above. As the aliphatic diisocyanate compound, there can be mentioned hexamethylene diisocyanate, trimethylhexamethylene diisocyanate, diisocyanato methylcyclohexane, isophorone diisocyanate, methylene-bis(4-cyclohexyl isocyanate), etc.

(II) Trifunctional (meth)acrylate Type Polymerizable Monomer

Methacrylates such as trimethylolpropane trimethacrylate, trimethylolethane trimethacrylate, pentaerythritol trimethacrylate, trimethylolmethane trimethacrylate, and the like; acrylates corresponding to these methacrylates; etc.

(III) Tetrafunctional (meth)acrylate Type Polymerizable monomer

Pentaerythritol tetramethacrylate, pentaerythritol tetraacrylate, diadducts obtained by the addition reaction between diisocyanate compound and glycidol dimethacrylate, etc.

Incidentally, as the diisocyanate compound, there can be mentioned diisocyanato methylbenzene, diisocyanato methylcyclohexane, isophorone diisocyanate, hexamethylene diisocyanate, trimethylhexamethylene diisocyanate, methylene-bis(4-cyclohexyl isocyanate), 4,4-diphenylmethane diisocyanate, tolylene-2,4-diisocyanate, etc.

The above-mentioned (meth)acrylate type polymerizable monomer may be used in the composition of a plurality of monomers, as necessary.

As necessary, it is possible to use a monofunctional (meth)acrylate type polymerizable monomer or a radical-polymerizable monomer other than the (meth)acrylate type polymerizable monomers. As the monofunctional (meth)acrylate type polymerizable monomer, there can be mentioned methyl (meth)acrylate, ethyl (meth)acrylate, isopropyl (meth)acrylate, hydroxyethyl (meth)acrylate, tetrahydrofurfuryl (meth)acrylate, glycidyl (meth)acrylate, etc.

(B) Photopolymerization Initiator Component (b1) α-Diketone Compound

As the α-diketone compound which is the component (b1), there can be used, with no restriction, a known α-diketone compound used as a photopolymerization initiator. As examples of the α-diketone compound, there can be mentioned camphorquinones (e.g. camphorquinone, camphorquinonecarboxylic acid and camphorquinonesulfonic acid), diacetyl, acetylbenzoyl, 2,3-pentadione, 2,3-octadione, 9,10-phenanthrenequinone, acenaphthenequinone, etc.

The α-diketone compound is selected appropriately depending upon the wavelength and intensity of the light applied in polymerization, the time of light application, and the kinds and amounts of other components combined together. The α-diketone compound may be used singly or in admixture of two or more kinds.

When the curable material kit of the present invention is a dental kit, the light used in photo-curing the present curable material is ordinarily a visible light in consideration of, for example, the safety to human body. Accordingly, the α-diketone compound preferably has the maximum absorption wavelength in a visible light region. Generally, camphorquinones are preferred and camphorquinone is preferred particularly.

The use amount of the α-diketone compound differs depending upon the other components constituting the photopolymerization initiator and the kind of the radical-polymerizable monomer component used. The use amount of the α-diketone compound is ordinarily 0.01 to 5 mass parts, preferably 0.03 to 2 mass parts relative to 100 mass parts of the radical-polymerizable monomer. As the use amount of the α-diketone compound is larger, the curing time by actinic ray is shorter; as the use amount is smaller, the stability to environmental light is higher.

(b2) Aliphatic Tertiary Amine Compound

The aliphatic tertiary amine compound used as the component (b2) in the photopolymerization initiator, is an amine compound having a tertiary amino group in which three saturated aliphatic groups bond to the nitrogen atom. In this amine compound, an electroattracting group bonds to one of the three saturated aliphatic groups, and no electroattracting group bonds to other two saturated aliphatic groups. Hereinafter, such an aliphatic tertiary amine compound is referred to also as aliphatic tertiary amine compound of "one electroattracting saturated aliphatic group-bonded type".

Incidentally, an aliphatic tertiary amine compound in which two or more saturated aliphatic groups each having an electroattracting group bond to the nitrogen atom, is hereinafter referred to also as aliphatic tertiary amine compound of "two or more electroattracting aliphatic groups-bonded type".

The photopolymerization initiator containing an aliphatic tertiary amine compound of two or more electroattracting saturated aliphatic groups-bonded type shows a high photopolymerization activity when used singly in a curable material. However, it shows a significantly reduced photopolymerization activity when used in a dual-cure curable material containing two kinds of polymerization initiators, i.e. a photopolymerization initiator containing an aliphatic tertiary amine compound of two or more electroattracting aliphatic groups-bonded type and a chemical polymerization initiator (to be described later) containing an N,N-di(hydroxyalkyl)-p-toluidine compound.

In the present invention, there is used, as the photopolymerization initiator component (b2), an amine of one electroattracting saturated aliphatic group-bonded type. As a result, the dual-cure curable material of the present invention, although containing a chemical polymerization initiator containing an N,N-di(hydroxyalkyl)-p-toluidine compound, can highly retain a high photopolymerization activity.

As the aliphatic tertiary amine of one electroattracting saturated aliphatic group-bonded type, a known amine having the structure of the aliphatic tertiary amine can be used with no particular restriction. The electroattracting group is a group having inductive effect of attracting the electron of the carbon atom of saturated aliphatic group to which the electroattracting group bonds, and it may be any known electroattracting group. However, as the electroattracting group, there are preferred, for high chemical stability, hydroxyl group, aryl group (e.g. phenyl group or naphthyl group), unsaturated aliphatic group (e.g. ethenyl group (vinyl group), 1-propenyl group or ethynyl group), fluorine atom, alkoxyl group, carbonyl group, carbonyloxy group, cyano group, and unsaturated double bond-containing polymerizable group (e.g. (meth)acryloyloxy group or (meth)acrylamide group). Of these electroattracting groups, particularly preferred are aryl group, hydroxyl group and unsaturated double bond-containing polymerizable group (e.g. (meth)acryloyloxy group or (meth)acrylamide group) because they excel in the stability of compound, are easy to synthesize or procure, and excel in the solubility in radical-polymerizable monomer. As the electroattracting group, (meth)acryloyloxy group is most preferred because, when used as a dental material for in-mouth application, the risk of amine dissolution-out after curing is low.

As the saturated aliphatic group to which an electroattracting group bonds, there is no particular restriction, and there may be used any of straight chain, branched and cyclic saturated aliphatic groups. Preferred from the standpoint of the easiness of synthesis or procurement is a straight chain or branched saturated aliphatic group of 1 to 6 carbon atoms; more preferred is a straight chain or branched alkyl group of 1 to 6 carbon atoms, such as methyl group, ethyl group, propyl group, butyl group or the like; particularly preferred is an alkyl group of 2 to 4 carbon atoms. There is no particular restriction, either, as to the bonding site and number of the electroattracting group. However, when the electroattracting group bonds to a carbon atom closer to the nitrogen atom of amino group, a higher polymerization activity tends to be obtained. Specifically explaining, it is preferred that the electroattracting group bonds to the carbon atom bonding to the nitrogen atom (i.e. the position 1 carbon atom of saturated aliphatic group) or the carbon atom adjacent thereto (i.e. the position 2 carbon atom of saturated aliphatic group).

As specific examples of the saturated aliphatic group having an electroattracting group as a substituent, there can be mentioned a saturated aliphatic group having a hydroxyl group (an electroattracting group) as a substituent, such as 2-hydroxyethyl group, 2-hydroxypropyl group, 2-hydroxybutyl group, 2,3-dihydroxypropyl group or the like; a saturated aliphatic group having an unsaturated aliphatic group (an electroattracting group), such as allyl group (ethenylmethyl group), 2-propenyl group (ethynylmethyl group), 2-butenyl group or the like; a saturated aliphatic group having an aryl group (an electroattracting group), such as benzyl group or the like; and a saturated aliphatic group having an unsaturated double bond-containing polymerizable group, such as (meth)acryloyloxyethyl group or the like.

The saturated aliphatic groups bonding to the nitrogen atom, other than the saturated aliphatic group having an electroattracting group as a substituent, have no electroattracting group as a substituent. As the saturated aliphatic groups having no electroattracting group as a substituent, a straight chain or branched saturated aliphatic group of 1 to 6 carbon atoms is preferred, and a straight chain or branched alkyl group of 1 to 6 carbon atoms such as methyl group, ethyl group, propyl group, butyl group or the like is preferred.

As the aliphatic tertiary amine of one electroattracting saturated aliphatic group-bonded type, a compound of the general formula (1) is particularly preferred because it has a radical-polymerizable group and is low in the risk of after-cure dissolution-out from cured material.

[Formula 1]

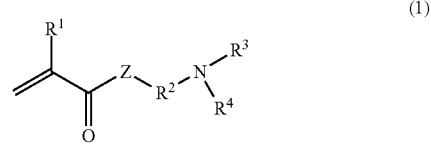

(1)

(In the above formula, Z is an oxygen atom or an NH group; $R^1$ is a hydrogen atom or a methyl group; $R^2$ is an alkylene group of 1 to 6 carbon atoms; and $R^3$ and $R^4$ are each independently an alkyl group of 1 to 6 carbon atoms.)

As the compound represented by the general formula (1), a compound in which Z is an oxygen atom, is preferred particularly.

Below are shown specific examples of the compound represented by the general formula (1) (polymerizable monomer) used particularly preferably.

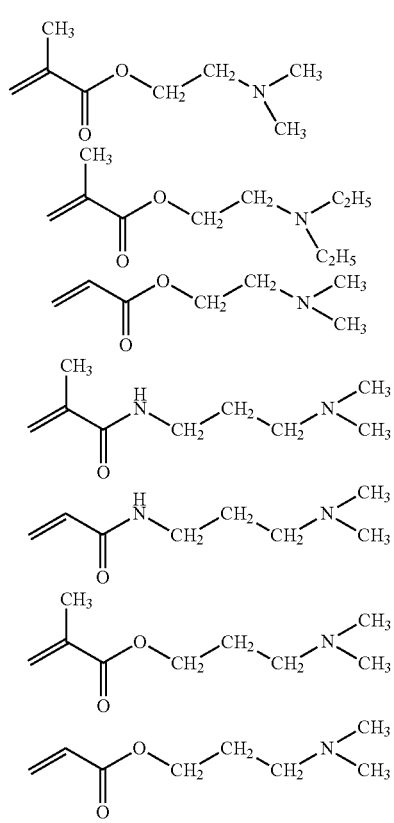

[Formula 2]

The details of, for example, the production method of the compound represented by the general formula (1) are described in, for example, JP2-17155 A.

As examples of the aliphatic amine compound of one electroattracting saturated aliphatic group-bonded type, there are also mentioned, besides the above-shown compounds of the general formula (1), dimethylaminoethanol, diethylaminoethanol, 2[2-(dimethylamino)ethoxy]ethanol, 1-dimethylamino-2-propanol, and 3-dimethylamino-1-propanol.

The use amount of the aliphatic tertiary amine of one electroattracting saturated aliphatic group-bonded type, i.e. (B) (b2) differs depending upon the other components constituting the photopolymerization initiator and the kind of radical-polymerizable monomer component. Ordinarily, the use amount of the aliphatic tertiary amine is preferably 0.01 to 5 mass parts, more preferably 0.03 to 3 mass parts relative to 100 mass parts of the radical-polymerizable monomer. As the use amount of the aliphatic tertiary amine compound is larger, the curing activity upon light application is higher. When the use amount of the aliphatic tertiary amine compound is excessive, lower excess results in cured material of better properties.

(b3) s-Triazine Compound Having a Trihalomethyl Group as a Substituent

The (b3) component used in the photopolymerization initiator is an s-triazine compound having at least one trihalomethyl group as a substituent (hereinafter, this compound may be referred to merely as "trihalomethyl group-substituted triazine compound"). Examples of the trihalomethyl group include trichloromethyl group and tribromomethyl group. As the s-triazine compound having a trihalomethyl group, a known compound can be used with no restriction. A particularly preferred trihalomethyl group-substituted triazine compound is shown by the following general formula (2).

[Formula 3]

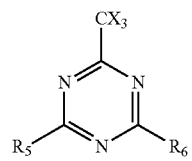

(2)

(In the above formula, $R^5$ and $R^6$ are each an organic group having an unsaturated bond conjugatable with triazine ring, an alkyl group which may be substituted with a halogen atom, or an alkoxy group which may be substituted with an amino group; and X is a halogen atom.)

In the general formula (2), the halogen atom represented by X is chlorine, bromine or iodine, but is generally chlorine. Accordingly, the substituent ($CX_3$) bonding to the triazine ring is generally trichloromethyl group.

$R^5$ and $R^6$ may each be any of an organic group having an unsaturated bond conjugable with triazine ring, an alkyl group and an alkoxy group. However, when at least either of $R^5$ and $R^6$ is a halogen-substituted alkyl group, good polymerization activity is obtained easily; and when both of them are a halogen-substituted alkyl group, very good polymerization activity is obtained.

The organic group having an unsaturated bond conjugable with triazine ring may be any known organic group but is preferably an organic group of 2 to 30 carbon atoms, particularly preferably an organic group of 2 to 14 carbon atoms. As the organic group, there can be mentioned, for example, an aryl group of 6 to 14 carbon atoms such as phenyl group, methoxyphenyl group, p-methylthiophenyl group, p-chlorophenyl group, 4-biphenylyl group, naphthyl group, 4-methoxy-1-naphthyl group or the like; and an alkenyl group of 2 to 14 carbon atoms such as vinyl group, 2-phenylethenyl group, 2-(substituted phenyl)ethenyl group or the like. Incidentally, as the substituent possessed by the substituted phenyl group, there can be mentioned, for example, an alkyl group of 1 to 6 carbon atoms such as methyl group, ethyl group, propyl group or the like; an alkoxy group of 1 to 6 carbon atoms such as methoxy group, ethoxy group, propoxy group or the like; an alkylthio group of 1 to 6 carbon atoms such as methylthio group, ethylthio group, propylthio group or the like; a phenyl group, and a halogen atom.

$R^5$ and $R^6$ may each be an alkyl group. The alkyl group may be substituted with halogen atom. The alkyl group preferably has 1 to 10 carbon atoms, and there can be mentioned, for example, an unsubstituted alkyl group such as methyl group, ethyl group, n-propyl group, isopropyl group, n-butyl group, n-hexyl group or the like; and a halogen-substituted alkyl group such as trichloromethyl group, tribromomehtyl group, α,α,β-trichloroethyl group or the like.

$R^5$ and $R^6$ may each be also an alkoxy group. The alkoxy group may be substituted with amino group. The alkoxy group preferably has 1 to 10 carbon atoms, and there can be mentioned, for example, an unsubstituted alkoxy group such as methoxy group, ethoxy group, butoxy group or the like; and an amino group-substituted alkoxy group such as 2-{N,N-bis(2-hydroxyethyl)amino}ethoxy group, 2-{N-hydroxyethyl-N-ethylamino}ethoxy group, 2-{N-hydroxyethyl-N-methylamino}ethoxy group, 2-{N,N-diallylamino}ethoxy group or the like.

As the trihalomethyl group-substituted triazine compound represented by the general formula (2), there can be mentioned, for example, 2,4,6-tris(trichloromethyl)-s-triazine, 2,4,6-tris(tribromomethyl)-s-triazine, 2-methyl-4,6-bis(trichloromethyl)-s-triazine, 2-methyl-4,6-bis(tribromomethyl)-s-triazine, 2-phenyl-4,6-bis(trichloromethyl)-s-triazine, 2-(p-methoxyphenyl)-4,6-bis(trichloromethyl)-s-triazine, 2-(p-methylthiophenyl)-4,6-bis(trichloromethyl)-s-triazine, 2-(p-chlorophenyl)-4,6-bis(trichloromethyl)-s-triazine, 2-(2,4-dichlorophenyl)-4,6-bis(trichloromethyl)-s-triazine, 2-(p-bromophenyl)-4,6-bis(trichloromethyl)-s-triazine, 2-(p-tolyl)-4,6-bis(trichloromethyl)-s-triazine, 2-n-propyl-4,6-bis(trichloromethyl)-s-triazine, 2-($\alpha,\alpha,\beta$-trichloroethyl)-4,6-bis(trichloromethyl)-s-triazine, 2-styryl-4,6-bis(trichloromethyl)-s-triazine, 2-[2-(p-methoxyphenyl)ethenyl]-4,6-bis(trichloromethyl)-s-triazine, 2-[2-(o-methoxyphenyl)ethenyl]-4,6-bis(trichloromethyl)-s-triazine, 2-[2-(p-butoxyphenyl)ethenyl]-4,6-bis(trichloromethyl)-s-triazine, 2-[2-(3,4-dimethoxyphenyl)ethenyl]-4,6-bis(trichloromethyl)-s-triazine, 2-[2-(3,4,5-trimethoxyphenyl)ethenyl]-4,6-bis(trichloromethyl)-s-triazine, 2-(1-naphthyl)-4,6-bis(trichloromethyl)-s-triazine, 2-(4-biphenylyl)-4,6-bis(trichloromethyl)-s-triazine, 2-[2-{N,N-bis(2-hydroxyethyl)amino}ethoxy]-4,6-bis(trichloromethyl)-s-triazine, 2-[2-{N-hydroxyethyl-N-ethylamino}ethoxy]-4,6-bis(trichloromethyl)-s-triazine, 2-[2-{N-hydroxyethyl-N-methylamino}ethoxy]-4,6-bis(trichloromethyl)-s-triazine, and 2-[2-{N,N-diallylamino}ethoxy]-4,6-bis(trichloromethyl)-s-triazine.

As particularly preferable compounds of the above triazine compounds, there can be mentioned, for high polymerization activity, etc., 2,4,6-tris(trichloromethyl)-s-triazine, 2-phenyl-4,6-bis(trichloromethyl)-s-triazine, 2-(p-chlorophenyl)-4,6-bis(trichloromethyl)-s-triazine, and 2-(4-biphenylyl)-4,6-bis(trichloromethyl)-s-triazine. These trihalomethyl group-substituted triazine compounds may be used singly or in admixture of two or more kinds.

b3) Diaryliodonium Salt Compound

The diaryliodonium salt compound used in the photopolymerization initiator is a compound represented by the following general formula (3).

[Formula 4]

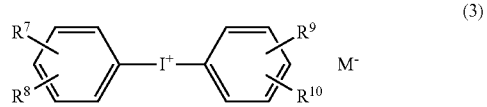

(3)

(In the above formula, $R^7$, $R^8$, $R^9$ and $R^{10}$ are each independently a hydrogen atom, a halogen atom, an alkyl group, an aryl group, an alkenyl group, an alkoxy group, an aryloxy group, or a nitro group; and $M^-$ is an anion.)

Here, when $R^7$, $R^8$, $R^9$ and $R^{10}$ are each a halogen atom, the halogen atom includes fluorine atom, chlorine atom, bromine atom and iodine atom.

The alkyl group is preferably an alkyl group of 1 to 20 carbon atoms; and there can be mentioned, for example, methyl group, ethyl group, propyl group, isopropyl group, butyl group, sec-butyl group, pentyl group, isopentyl group and hexyl group.

The aryl group is preferably an aryl group of 6 to 14 carbon atoms; and there can be mentioned, for example, phenyl group, p-methylphenyl group, p-chlorophenyl group and naphthyl group.

The alkenyl group is preferably an alkenyl group of 2 to 14 carbon atoms; and there can be mentioned, for example, vinyl group, allyl group, isopropenyl group, butenyl group, 2-phenylethenyl group and 2-(substituted phenyl)ethenyl group.

The alkoxy group is preferably an alkoxy group of 1 to 6 carbon atoms; and there can be mentioned, for example, methoxy group, ethoxy group, propoxy group and butoxy group.

The aryloxy group is preferably an aryloxy group of 6 to 14 carbon atoms; and there can be mentioned, for example, phenoxy, p-methoxyphenyl and p-octyloxyphenyl.

As specific examples of the diaryliodonium salt, there can be mentioned diaryliodonium salts comprising a cation (e.g. diphenyliodonium, bis(p-chlorophenyl)iodonium, ditolyliodonium, bis(p-tert-butylphenyl)iodonium, p-isopropylphenyl-p-methylphenyliodonium, bis(m-nitrophenyl)iodonium, p-tert-butylphenyliodonium, p-methoxyphenylphenyliodonium, bis(p-methoxyphenyl)iodonium or p-octyloxyphenylphenyliodonium) and an anion (e.g. chloride, bromide, p-toluenesulfonate, trifluoromethanesulfonate, tetrafluoroborate, tetrakispentafluorophenylborate, tetrakispentafluorophenylgallate, hexafluorophosphate, hexafluoroarsenate or hexafluoroantimonate).

Of these diaryliodonium salts, preferred from high solubility in radical-polymerizable monomer are salts of p-toluenesulfonate, trifluoromethanesulfonate, tetrafluoroborate, tetrakispentafluorophenylborate, tetrakispentafluorophenylgallate, hexafluorophosphate, hexafluoroarsenate and hexafluoroantimonate; particularly preferred from high storage stability are salts of tetrakispentafluorophenylborate, tetrakispentafluorophenylgallate and hexafluoroantimonate.

The use amount of the trihalomethyl group-substituted triazine compound or the diaryliodonium salt differs depending upon the other components constituting the photopolymerization initiator and the kind of the radical-polymerizable monomer component, but ordinarily is preferably 5 to 1,000 mass parts, more preferably 30 to 500 mass parts relative to 100 mass parts of the $\alpha$-diketone compound (b1). The trihalomethyl group-substituted triazine compound or the diaryliodonium salt can be preferably used in the above amount range in a dental curable material because, in the amount range, a very high polymerization activity is obtained and the color of the cured resin obtained is not influenced.

(C) Chemical Polymerization Initiator Component (c1) Organic Peroxide

As the organic peroxide (c1) component of the chemical polymerization initiator, there can be used, with no restriction, a known organic peroxide used as a chemical polymerization initiator. Specific examples thereof are shown below.

Ketone Peroxides

Methyl ethyl ketone peroxide, cyclohexanone peroxide, methylcyclohexanone peroxide, methyl acetoacetate peroxide, acetylacetone peroxide, etc.

Peroxyketals 1,1-Bis(tert-hexylperoxy)-3,3,5-trimethylcyclohexane, 1,1-bis(tert-hexylperoxy)cyclohexane, 1,1-bis(tert-butylperoxy)-3,3,5-trimethylcyclohexane, 1,1-bis(tert-butylperoxy)cyclohexane, 1,1-bis(tert-butylperoxy)cyclododecane, 2,2-bis(tert-butylperoxy)butane, n-butyl 4,4-bis(tert-butylperoxy)valerate, 2,2-bis(4,4-di-tert-butylperoxycyclohexyl)propane, etc.

Hydroperoxides p-Menthane hydroperoxide, diisopropylbenzene hydroperoxide, 1,1,3,3-tetramethylbutyl hydroperoxide, cumene hydroperoxide, tert-hexyl hydroperoxide, tert-butyl hydroperoxide, etc.

Dialkyl Peroxides

α,α-Bis(tert-butylperoxy)diisopropylbenzene, dicumyl peroxide, 2,5-dimethyl-2,5-bis(tert-butylperoxy)hexane, tert-butylcumyl peroxide, di-tert-butyl peroxide, 2,5-dimethyl-2,5-bis(tert-butylperoxy)hexyne-3, etc.

Diacyl Peroxides

Isobutylyl peroxide, 2,4-dichlorobenzoyl peroxide, 3,5,5-trimethylhexanoyl peroxide, octanoyl peroxide, lauroyl peroxide, stearyl peroxide, succinic acid peroxide, m-toluoylbenzoyl peroxide, benzoyl peroxide, etc.

Peroxydicarbonates

Di-n-propyl peroxydicarbonate, diisopropyl peroxydicarbonate, bis(4-tert-butylcyclohexyl)peroxydicarbonate, di-2-ethoxyethyl peroxydicarbonate, di-2-ethylhexyl peroxydicarbonate, di-2-methoxybutyl peroxydicarbonate, di(3-methyl-3-methoxybutyl)peroxydicarbonate, etc.

Peroxy Esters

α,α-Bis(neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, tert-hexyl peroxyneodecanoate, tert-butyl peroxyneodecanoate, tert-hexyl peroxypivalate, tert-butyl peroxypivalate, 1,1,3,3-tetramethylbutyl peroxy-2-ethylhexanoate, 2,5-dimethyl-2,5-(bis(2-ethylhexanoylperoxy)hexane, 1-cyclohexyl-1-methylethyl peroxy-2-ethylhexanoate, tert-hexyl peroxy 2-ethylhexanoate, tert-butyl peroxy 2-ethylhexanoate, tert-butyl peroxyisobutyrate, tert-hexyl peroxyisopropylmonocarbonate, tert-butyl peroxymaleic acid, tert-butyl peroxy 3,5,5-trimethylhexanoate, tert-butyl peroxylaurate, 2,5-dimethyl-2,5-bis(m-toluoylperoxy)hexane, tert-butyl peroxyisopropylmonocarbonate, tert-butyl peroxy 2-ethylhexylmonocarbonate, tert-hexyl peroxybenzoate, 2,5-dimethyl-2,5-bis(benzoylperoxy)hexane, tert-butyl peroxyacetate, tert-butyl peroxy-m-toluoylbenzoate, tert-butyl peroxybenzoate, bis(tert-butylperoxy)isophthalate, etc.

Of the above-mentioned organic peroxides, preferred from the high polymerization activity are ketone peroxides, peroxy esters and diacyl peroxides; more preferred are diacyl peroxides and hydroperoxides; most preferred are diacyl peroxides represented by benzoyl peroxide.

The use amount of the organic peroxide (c1) differs depending upon, for example, the kind of radical-polymerizable monomer component. Ordinarily, the use amount is preferably 0.01 to 10 mass parts, more preferably 1 to 5 mass parts relative to 100 mass parts of the radical-polymerizable monomer. When the use amount of the organic peroxide is larger, the curing activity upon light application is higher. When the use amount of the organic peroxide is excessive, a smaller excess provides a cured material of better properties after complete curing.

(c2) N,N-di(hydroxyalkyl)-p-toluidine Compound

An N,N-di(hydroxyalkyl)-p-toluidine compound as (c2) component is compounded in the chemical polymerization initiator as a reaction species for generating a polymerization-activating species (radical) from the organic peroxide (c1).

As the N,N-di(hydroxyalkyl)-p-toluidine compound (c2), such a compound having an alkyl group (in a hydroxyalkyl group) of 1 to 6 carbon atoms is preferred and a compound having an alkyl group of 1 to 3 carbon atoms is more preferred. As specific examples, there can be mentioned, for example, N,N-di(hydroxymethyl)-p-toluidine, N,N-di(hydroxyethyl)-p-toluidine, N,N-di(hydroxypropyl)-p-toluidine and N,N-di(hydroxyhexyl)-p-toluidine. Of these, N,N-di(hydroxyethyl)-p-toluidine is particularly preferred because it has the highest polymerization activity.

The use amount of the N,N-di(hydroxyalkyl)-p-toluidine compound (c2) differs depending upon, for example, the kind of radical-polymerizable monomer component. Ordinarily, the use amount is preferably 0.1 to 10 mass parts, more preferably 0.3 to 3 mass parts relative to 100 mass parts of the radical-polymerizable monomer. As the use amount of N,N-di(hydroxyalkyl)-p-toluidine compound is larger, the curing activity based on chemical polymerization is higher. When the use amount is excessive, the curing activity in photopolymerization is low.

Next, description is made on the packaging form of the dual-cure curable material kit of the present invention containing the above-mentioned individual components.

The photopolymerization initiator component (B) and the chemical polymerization initiator component (C) both compounded in the dual-cure curable material kit of the present invention are packed separately in the market distribution, so as to satisfy both of the following packaging requirements (1) and (2), in consideration of the storage stability of the kit.

(Packaging Requirement 1)

The aliphatic tertiary amine of one electroattracting saturated aliphatic group-bonded type (b2) and the trihalomethyl group-substituted triazine compound (b3) both constituting the photopolymerization initiator component (B) are not present in a single package and are packed separately.

(Packaging Requirement 2)

The organic peroxide (c1) and the N,N-di(hydroxyalkyl)-p-toluidine compound (c2) both constituting the chemical polymerization initiator component (C) are not present in a single package and are packed separately.

Accordingly, two kinds of polymerization initiators constituted by the photopolymerization initiator component (B) and the chemical polymerization initiator component (C) are packed separately in at least two different packages, as a whole. The reason thereof is described below.

When the component (c1) and the component (c2) both constituting the chemical polymerization initiator component (C) are allowed to be present in a single package, a polymerization-activating species is generated during the storage of the package and the chemical polymerization initiator component is consumed. As a result, no polymerization-initiating function is exhibited in use of dual-cure curable material kit. Further, when the single package contains the radical-polymerizable monomer component (A), the monomer component is polymerized and gelled during the storage of the package. Therefore, as mentioned above, the component (c1) and the component (c2) are packed separately in two different packages.

As mentioned above, in the photopolymerization initiator component (B), one electroattracting saturated aliphatic group-bonded type is used as the aliphatic tertiary amine (b2). As a result, even when there is used a chemical polymerization initiator containing an N,N-di(hydroxyalkyl)-p-toluidine compound in production of a dual-cure curable material kit, the high polymerization activity of photopolymerization initiator is not impaired.

However, the photopolymerization initiator using the aliphatic tertiary amine of one electroattracting saturated aliphatic group-bonded type is significantly inferior to a photopolymerization initiator using an aliphatic tertiary amine of two or more electroattracting saturated aliphatic groups-bonded type, in the storage stability. As a result, the high polymerization activity of the photopolymerization initiator using an aliphatic tertiary amine of two or more one electroattracting saturated aliphatic groups-bonded type shows a large drop as the photopolymerization initiator is stored long period. It was confirmed that this drop in polymerization activity was prevented advantageously by separately packing, in different packages, the aliphatic tertiary amine of one electroattracting saturated aliphatic group-bonded type and the trihalomethyl group-substituted triazine compound (b3). For this reason, in the present invention, the aliphatic tertiary amine of one electroattracting saturated aliphatic group-bonded type (b2) and the trihalomethyl group-substituted triazine compound (b3) are packed separately in two different packages, as described previously.

The specific packaging form of the component (b2) and the component (b3) both of the photopolymerization initiator component (B) and of the component (c1) and the component (c2) both of the chemical polymerization initiator component (C) are not particularly restricted as long as both of the above-mentioned packaging requirements 1 and 2 are satisfied.

For example, the individual components may be packed separately in at least total four different packages. However, the number of total packages is desired to be as small as possible in view of the mixing efficiency when the dual-cure curable material kit is used and the space when the packages are stored. From this standpoint of making smaller the number of packages, the packaging form of the present kit is preferably as follows. That is, the component (b2) and the component (b3) both of the photopolymerization initiator component (B) must be packed separately. Meanwhile, the component (c1) and the component (c2) both of the chemical polymerization initiator component (C) must be naturally packed separately. Hence, in view of these requirements for separate packaging, it is considered that, of the individual components of the photopolymerization initiator component (B) and the chemical polymerization initiator component (C), components causing no inconvenience on polymerization activity are combined in order to make the number of total packages as small as possible. In this case, the total components can be separately packed in minimum (two) different packages.

A particularly preferred packaging form is a form of dividing to the following two packages (I) and (II).

(I) A package containing the component (b2) of the photopolymerization initiator component (B) and the component (c2) of the chemical polymerization initiator component (C).

(II) A package containing the component (b3) of the photopolymerization initiator component (B) and the component (c1) of the chemical polymerization initiator component (C).

In the present invention, a package containing the radical-polymerizable monomer component (A) and the α-diketone compound (B) (b1) may be separated from the above-mentioned two packages formed for separation of the component (b2) and the component (b3) both of the photopolymerization initiator component (B) and separation of the component (c1) and the component (c2) both of the chemical polymerization initiator component (C). However, the radical-polymerizable monomer component (A) and the α-diketone compound (B) (b1) are preferably compounded in the above-mentioned two packages in view of the operation and storage space of dual-cure curable material kit. Therefore, the radical-polymerizable monomer component (A) is compounded ordinarily in both of the packages (I) and (II), in divided portions. In this case, the compounding ratio of the radical-polymerizable monomer component (A) in the two packages is such as to allow for equal-volume mixing of the two packages (I) and (II) in using the kit, because such a ratio makes easy the operation of kit.

Further, the α-diketone compound (b1) may be packed in any of the package (I) and the package (II). However, packing in the package (I) may reduce the photo-stability of the resulting package. Therefore, the α-diketone compound (b1) is preferably compounded in the package (II).

In the curable material kit of the present invention, there is preferably compounded, in addition to the above-mentioned components, an aromatic tertiary amine compound represented by the general formula (4).

[Formula 5]

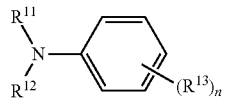

(4)

(In the above formula, $R^{11}$ and $R^{12}$ are each independently an alkyl group; and $R^{13}$ is an alkyl group, an aryl group, an alkenyl group, an arylalkenyl group, an alkoxy group, or an alkyloxycarbonyl group. n is an integer of 0 to 5. When n is 2 or larger, a plurality of $R^{13}$s may be the same or different.)

The alkyl group of $R^{11}$, $R^{12}$ or $R^{13}$ is preferably an alkyl group of 1 to 6 carbon atoms, and there can be mentioned, for example, methyl group, ethyl group, n-propyl group, isopropyl group, n-butyl group and n-hexyl group. As the groups $R^{11}$ and $R^{12}$, an alkyl group of 1 to 3 carbon atoms, such as methyl group, ethyl group, n-propyl group or the like is more preferred.

As the aryl group, there can be mentioned an aryl group of 6 to 12 carbon atoms, such as phenyl group, p-methoxyphenyl group, p-methylthiophenyl group, p-chlorophenyl group, 4-biphenylyl group or the like. As the alkenyl group, there can be mentioned an alkenyl group of 2 to 6 carbon atoms, such as vinyl group, allyl group or the like. As the arylalkenyl group, there can be mentioned an arylalkenyl group of 8 to 20 carbon atoms, such as 2-phenylethenyl group, 2-phenylpropenyl group or the like. As the alkoxy group, there can be mentioned an alkoxy group of 1 to 6 carbon atoms, such as methoxy group, ethoxy group, butoxy group or the like. As the alkyloxycarbonyl group, there can be mentioned such a group having an alkyloxy group of 1 to 10 carbon atoms, such as methoxycarbonyl group, ethoxycarbonyl group, butoxycarbonyl group, amyloxycarbonyl group, isoamyloxycarbonyl group or the like.

The bonding site of group $R^{13}$ is preferably a para-position when n=1. The group $R^{13}$ is preferably an alkyl group or an alkyloxycarbonyl group and, for higher polymerization activity, particularly preferably an alkyloxycarbonyl group. When an aromatic tertiary amine of the general formula (4) having an alkyl group or an alkyloxycarbonyl group-substituted aromatic group is combined with the aliphatic tertiary amine compound (b2), a higher polymerization activity is obtained. Further, 2 to 3 $R^{13}$ groups are bonded, the bonding sites thereof are preferably an ortho-position and/or a para-position relative to phenyl group. By bonding of a plurality of $R^{13}$ groups to an ortho-position and a para-position relative to phenyl group, the cured material obtained has higher stability to sunlight. When $R^{13}$ groups bond to all ortho-positions and para-positions relative to phenyl group, it is preferred particularly.

As specific examples of the aromatic tertiary amine in which an alkyloxycarbonyl group (R″) bonds to the para-position of phenyl group, there can be mentioned methyl p-dimethylaminobenzoate, ethyl p-dimethylaminobenzoate, propyl p-dimethylaminobenzoate, amyl p-dimethylaminobenzoate, isoamyl p-dimethylaminobenzoate, ethyl p-diethylaminobenzoate and propyl p-diethylaminobenzoate.

As specific examples of the aromatic tertiary amine to which 2 to 3 alkyloxycarbonyl groups ($R^{13}$) bond, the following compounds can be mentioned.

[Formula 6]

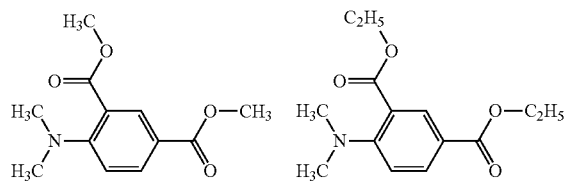

The aromatic tertiary amine compound represented by the general formula (4) has a function of enhancing photopolymerization activity in association with the aliphatic tertiary amine of one electroattracting saturated aliphatic group-bonded type (b2) of the photopolymerization initiator (B). Incidentally, the N,N-di(hydroxyalkyl)-p-toluidine compound (C) (c2) is also an aromatic amine compound but is inferior to the aromatic tertiary amine compound of general formula (4) in the function of enhancing photopolymerization activity. Accordingly, it is preferred to further compound the aromatic tertiary amine compound represented by the general formula (4). Further, the aromatic tertiary amine compound represented by the general formula (4) is very weak in the function of reacting with the organic peroxide (c1) of the chemical polymerization initiator (C) and generating a polymerization-activating species. Therefore, even when the aromatic tertiary amine compound represented by the general formula (4) is compounded, it is essential to compound the N,N-di(hydroxyalkyl)-p-toluidine compound (c2).

The aromatic tertiary amine represented by the general formula (4), similarly to the aliphatic tertiary amine of one electroattracting saturated aliphatic group-bonded type (b2), is preferably compounded so as not to be present in a single package together with the trihalomethyl group-substituted triazine compound (b3).

The aromatic tertiary amine represented by the general formula (4) may be packed in a new separate package. However, it is generally practical to compound the aromatic tertiary amine represented by the general formula (4) in the package (I) containing the (b2) component of the photopolymerization initiator component (B) and the (c2) component of the chemical polymerization initiator component (C), in order to reduce the number of packages.

The use amount of the aromatic tertiary amine represented by the general formula (4) differs depending upon the other components constituting the photopolymerization initiator and the kind of radical-polymerizable monomer component. Ordinarily, the use amount is preferably 0.01 to 5 mass parts, more preferably 0.1 to 3 mass parts relative to 100 mass parts of the radical-polymerizable monomer.

The ducal-cure curable material of the present invention may further contain other polymerization promoter which acts on the photopolymerization initiator or the chemical polymerization initiator as long as the addition does not impair the effect of the present invention. The other polymerization promotor may be added to the present kit as a new package. However, when there is no fear of such a side reaction that the effect of the present invention is impaired, it is efficient to compound the other polymerization promotor in any of at least two packages formed for separation of the (b2) component and the (b3) component both of the photopolymerization initiator component (B) and separation of the (c1) component and the (c2) component both of the chemical polymerization initiator component (C). As specific examples of the other polymerization promotor acting on the chemical polymerization initiator, there can be mentioned metal salts such as sodium p-toluenesulfinate, vanadium (IV) oxide acetylacetonate, and bis(maltolate) oxo vanadium.

The curable material kit of the present invention is used preferably as a dental curable material such as dental resin composite, dental cement, dental adhesive, dental pretreatment material, lining material for denture, resin for denture base, autopolymerizing resin, dental coating material, pit and fissure sealant or the like. The present curable material kit is used particularly preferably as a dental resin composite or a dental cement because they can exhibit higher dual-cure characteristic. When the present curable material kit is used as a dental resin composite or a dental cement, an inorganic filler is generally compounded further in the curable material kit of the present invention. As the inorganic filler compounded, a known filler is used with no restriction. As representative examples of the inorganic filler, there are mentioned silica glass, borosilicate glass, soda glass, aluminosilicate glass, fluoroaluminosilicate glass, glass containing a heavy metal (e.g. barium, strontium or zirconium); glass ceramics such as crystallized glass in which crystals are formed in one of the above-mentioned glasses, crystal glass in which crystals of diopside, leusite or the like are formed, and the like; composite inorganic oxides such as silica-zirconia, silica-titania, silica-alumina and the like; oxides obtained by adding a group I metal oxide to one of the composite inorganic oxides; and metal inorganic oxides such as silica, alumina, titania, zirconia and the like. These inorganic fillers may be used singly or in admixture of two or more kinds, with no problem.

It is also possible to use a granular organic-inorganic composite filler obtained by adding a polymerizable monomer beforehand to the above-mentioned inorganic filler to obtain a paste, polymerizing the polymerizable monomer, and grinding the cured material obtained.

The particle diameter of the inorganic filler is not restricted particularly. An organic filler having an average particle diameter of 0.01 μm to 100 μm (particularly preferably 0.01 to 6 μm), generally used in dental material application, is appropriately selected depending upon the application purpose of the curable material kit of the present invention. The refractive index of the inorganic filler is not particularly restricted, either. An inorganic filler having a refractive index of 1.4 to 1.7 generally possessed by dental fillers can be used with no restriction and is selected appropriately depending upon the application purpose of the curable material kit of the present invention. A plurality of inorganic fillers different in particle diameter range and refractive index may be used in combination.

The inorganic filler is preferably treated with a surface treatment agent represented by silica coupling agent. The surface treatment enhances the affinity of inorganic filler with radical-polymerizable monomer and the mechanical strength and water resistance of the dental material obtained. The method for surface treatment is known. As the silane coupling agent, there are preferred methyltrimethoxysilane, methyltriethoxysilane, methyltrichlorosilane, dimethyldichlorosilane, trimethylchlorosilane, vinyltrichlorosilane, vinyltriethoxysilane, vinyltris(β-methoxyethoxy)silane, γ-methacryloyloxypropyltrimethoxysilane, γ-chloropropyltrimethoxysilane, γ-glycidoxypropyltrimethoxysilane, hexamethyldisilazane, etc.

The inorganic filler may be packed in a new package and added to the curable material kit of the present invention. However, ordinarily, the inorganic filler is compounded, for efficiency, in any of at least two packages formed for separation of the component (b2) and the component (b3) both of the photopolymerization initiator component (B) and separation of the component (c1) and the component (c2) both of the chemical polymerization initiator component (C).

The use amount of the inorganic filer is appropriately determined depending upon the application purpose of the curable material kit of the present invention, in view of the viscosity (operability) when mixed with a radical-polymerizable monomer and the mechanical properties of the cured material obtained. Generally, the use amount of the inorganic filler is preferably 50 to 900 mass parts, more preferably 100 to 500 mass parts relative to 100 mass parts of the radical-polymerizable monomer.

In the curable material kit of the present invention, it is possible to further add water, an organic solvent, a thickening agent, etc. into appropriate packages, depending upon the application purpose of the kit, as long as the performances of the kit are not impaired. When they are added into the package (I) and the package (II), their addition amounts are adjusted so that the package (I) and the package (II) can be effectively mixed in equal volumes in using the kit. As the organic solvent, there can be mentioned, for example, hexane, heptane, octane, toluene, dichloroethane, methanol, ethanol and ethyl acetate. As the thickening agent, there can be mentioned, for example, a polymer compound (e.g. polyvinylpyrrolidone, carboxymethyl cellulose or polyvinyl alcohol) and high-dispersion silica. Besides, there may be added, into appropriate packages, a pigment, a fluorescent pigment, a dye, an ultraviolet absorber for prevention of discoloration by ultraviolet light, etc., depending upon the application purpose of the kit.

In the present invention, there is no particular restriction as to the mixing of individual components in each package constituting the kit. The mixing is conducted according to the known production method of dental photo-curing composition. Generally, predetermined amounts of individual components to be compounded are weighed and mixed using a stirrer represented by a mechanical stirrer, a mortar, or a mixer (e.g. planetary mixer) until uniformity is obtained (the weighing and mixing are conducted under light shielding).

The curable material of the present invention is used particularly preferably as a dental curable material such as mentioned above. However, the present curable material is usable also in other applications, using the curing characteristic of dual-cure type. The other applications include, for example, a photoresist material, a material for printing block, and hologram material.

In using the dual-cure curable material kit of the present invention, the contents of individual packages are mixed right before the use. By the mixing, the organic peroxide (c1) and the N,N-di(hydroxyalkyl)-p-toluidine compound (c2) both of the chemical polymerization initiator (C) come into contact with each other. As a result, chemical polymerization starts quickly after a certain period (ordinarily 2 to 10 minutes). The certain period can be achieved by controlling the use amount of chemical polymerization initiator, the polymerization promotor, etc.

Further, by applying a light of certain or higher intensity, it is possible to allow photopolymerization to proceed and rapid cure to take place. For the light applied, there can be used a known light source which is the same as ordinarily used for curing of monomer with an α-diketone type photopolymerization initiator. Specifically explaining, there can be preferably used a light source of visible light (preferably a light having a central wavelength of 400 to 600 nm), such as carbon arc, xenon lamp, metal halide lamp, tungsten lamp, LED, halogen lamp, helium cadmium laser, argon laser or the like. The time of application is appropriately determined depending upon the wavelength and intensity of a light emitted from a light source and the shape and material of cured material. For example, when the present kit is used as a dental resin composite, the application time is at least 5 seconds, preferably 10 seconds to 1 minute, enabling sufficient curing.

EXAMPLES

The present invention is described more specifically below by way of Examples. However, the present invention is in no way restricted by the Examples. Incidentally, the definitions and measurement methods of the properties of materials shown in the specification and Examples are shown below.

(1) Surface Hardness (Vickers Hardness) of Cured Material Cured by Photopolymerization A paste was filled in a polytetrafluoroethylene-made mold having a hole of 7 mm (diameter)×1 mm (depth). Immediately, a polypropylene film was press-contacted with the mold so as to cover the hole. Immediately thereafter, a dental light applicator (a product of Tokuyama Dental, Tokuso Power Light, light output density: 700 mW/cm$^2$) was closely contacted with the polypropylene film; and the paste was irradiated with a light for 10 seconds to give rise to curing. The cured material obtained was measured for hardness using a micro hardness tester (MHT-1 type, a product of Matsuzawa Seiki). A Vickers indenter was pressed against the cured material under the conditions of 100 gf (load) for 30 seconds (load holding time). The diagonal length of the dent formed in the cured material was measured to determine the Vickers hardness of the cured material. The above operation was conducted so as to be complete within 3 minutes after the automatic mixing of the paste, in order to avoid the curing of the paste taking place based on chemical polymerization.

(2) Evaluation of Curing Characteristic (Curing Starting Time, Curing Time) in Chemical Polymerization The test was conducted in a constant temperature chamber of 23° C. A paste was filled in a hole made of two wax sheets of 6 mm (inner diameter)×1.5 mm (thickness), and a thermocouple was inserted into the center of the paste. One minute after the start of mixing of the paste, the wax sheets which holes had been filled with the paste, were placed in a constant temperature water bath of 37° C., and the change of thermoelectromotive force was recorded using a pen recorder. The time taken from the start of mixing to the start of heat generation was read from the chart and taken as curing starting time. The time taken from the start of mixing to the top of heat generation peak was taken as curing time.

(3) Evaluation of Tensile Bond Strength in Photopolymerization and Chemical Polymerization Production of Mock Cavity A bovine anterior tooth was pulled out within 24 hours after slaughtering. The enamel and dentin of the tooth were grinded using a #600 emery paper under pouring water, to form a planar surface which was parallel to the labial surface. On the exposed planar surface formed by grinding was sprayed compressed air for about 10 seconds, to dry the planar area, whereby a tooth model was produced.

Onto the plane tooth surface of the tooth model was attached a double face adhesive tape having a hole of 3 mm in diameter. Then, onto the double surface adhesive tape was attached a paraffin wax (0.5 mm in thickness) having a hole of 8 mm in diameter. In this case, the attaching was conducted so that the center of the hole of the double face adhesive tape and the center of the hole of the wax become concentric each other. In this manner, a mock cavity was produced.

1. Bond Strength of Resin Cement by Chemical Polymerization

The inside of the mock cavity was applied with a pretreatment agent and allowed to stand for 20 seconds. Then, compressed air was sprayed for about 10 seconds to dry the pretreatment agent. Next, to the mock cavity was adhered and fixed a SUS 304-made metal attachment treated with a pretreatment agent, using a mixed material of CA-1 and CB-1, whereby an adhesion test piece was prepared.

The adhesion test piece was immersed in water of 37° C. for 24 hours and then subjected to a tensile bond strength test using a universal testing machine (Autograph produced by Shimadzu Corporation) to measure the tensile bond strength between the enamel or dentin of tooth and the metal attachment. The crosshead speed was 2 mm/min.

Tensile bond strength was measured on four adhesion test pieces, for each sample, and the average of the measurements was taken as bond strength.

2. Bond Strength of Resin Cement by Photopolymerization

The inside of the mock cavity was coated with a pretreatment agent and allowed to stand for 20 seconds. Then, compressed air was sprayed for about 10 seconds to dry the pretreatment agent. To the mock cavity was press-contacted a SUS 304-made metal attachment treated with a pretreatment agent, using a mixed material of CA-1 and CB-1. Then, a light was applied using a visible light applicator (Power Light produced by Tokuyama Dental) to cure the sample resin cement, whereby an adhesion test piece was produced. The light application was conducted along the diameter direction of mock cavity from four directions each different by 90°, for 10 seconds in each application.

The thus-produced adhesion test piece was measured for tensile adhesion strength in the same manner as mentioned above.

The compounds, materials, and abbreviations thereof, used in Examples and Comparative Examples are shown below.

b1) α-Diketone Compound
  Camphorquinone (hereinafter abbreviated as CQ)
b2) Aliphatic Tertiary Amine of One Electroattracting Saturated Aliphatic group-Substituted Type
  DMEM: N,N-dimethylaminoethyl methacrylate
  DMPM: N,N-dimethylaminopropyl methacrylate
  DMEOA: N,N-dimethylethanolamine
  DEEOA: N,N-diethylethanolamine
b3) s-Triazine Compound Having a Trihalomethyl Group as a Substituent
  TCT: 2,4,6-tris(trichloromethyl)-s-triazine
  PBCT: 2-phenyl-4,6-bis(trichloromethyl)-s-triazine
  CBCT: 2-(p-chlorophenyl)-4,6-bis(trichloromethyl)-s-triazine
b3) Diaryliodonium Salt Compound
  IPDPI: p-isopropylphenyl-p-methylphenyliodonium tetrakispentafluorophenylborate
  DPI: diphenyliodonium hexafluorophosphate
c1) Organic Peroxide
  Benzoyl peroxide (hereinafter abbreviated as BPO)
c2) N,N-di(hydroxyalkyl-p-toluidine compound)
  N,N-dihydroxyethyl-p-toluidine (hereinafter abbreviated as DEPT)
  N,N-dihydroxypropyl-p-toluidine (hereinafter abbreviated as DPPT)
Others)
  Ethyl 4-dimethylaminobenzoate (hereinafter abbreviated as DMBE)
  2,2-Bis[4-(2-hydroxy-3-methacryloxypropoxy)phenyl]propane (hereinafter abbreviated as Bis-GMA)
  2,2'-Bis[4-(methacryloxyethoxy)phenyl]propane (hereinafter abbreviated as D-2.6E)
  Triethylene glycol dimethacrylate (hereinafter abbreviated as 3G)
  2-Hydroxyethyl methacrylate (hereinafter abbreviated as HEMA)
  Bis(2-methacryloyloxyethyl) hydrogenphosphate (hereinafter abbreviated as PM2)
  Tetraphenylborate triethanolamine salt (hereinafter abbreviated as PhBTEOA)
  1,1,3,3-Tetramethylbutyl hydroperoxide (hereinafter abbreviated as POH)
  Bis(maltolate) oxovanadium (IV) (hereinafter abbreviated as BMOV)
  Spherical silica-zirconium (average particle diameter: 0.15 m)
  Indeterminate form silica-zirconia (surface-treated with γ-methacryloxypropyltrimethoxysilane) (average particle diameter: 3.5 μm)
  Fine powder silica (average particle diameter: 20 nm)
  BA: n-butylamine (aliphatic tertiary amine of electroattracting saturated aliphatic group-unsubstituted type)
  MDEOA: N-methyldiethanolamine (aliphatic tertiary amine of two electroattracting saturated aliphatic groups-substituted type)
  DMPT: N,N-dimethyl-p-toluidine Example 1

60 g of Bis-GMA and 40 g of 3G were weighed. Thereto were added 0.5 g of DMEM and 1.4 g of DEPT to prepare a matrix liquid A. 24 g of the matrix liquid A was mixed with 50 g of Indeterminate form silica-zirconia, 25 g of spherical silica-zirconia and 1 g of fine powder silica in a mortar to prepare a paste composition PA-1.

60 g of Bis-GMA and 40 g of 3G were weighed. Thereto were added 0.8 g of CQ, 0.3 g of TCT and 3.3 g of BPO to prepare a matrix liquid B. 24 g of the matrix liquid B was mixed with 50 g of Indeterminate form silica-zirconia, 25 g of spherical silica-zirconia and 1 g of fine powder silica in a mortar to prepare a paste composition PB-1.

The two pastes were filled in a double syringe (SDL X10-01-52, a product of Mixpac) and the double syringe was set in a dispenser (DL 10-01-00, a product of Mixpac). At the front end of the double syringe were fitted a mixing tip (ML 2.5-08-D, a product of Mixpac) and a front nozzle (IOR 209-20, a product of Mixpac), and the two pastes were subjected to automatic mixing and filled into a mold. The mixed paste filled was irradiated with a light. Immediately thereafter, the cured material formed by photopolymerization was measured for surface hardness, which showed an Hv of 48. Also, the double syringe filled with the pastes was stored at 37° C. for 1 week and then the same measurement was made, showing an Hv of 45. Separately, the curing characteristic in chemical polymerization was measured, indicating a curing starting time of 3.0 minutes and a curing time of 4.6 minutes.

Examples 2 to 11 and Comparative examples 1 to 12

Each two kinds of compositions were prepared in the same manner as in Example 1 except that the compositions used components and amounts used were shown in Table 1 and Table 2. The surface hardness of each cured material formed by photopolymerization and the curing characteristic in chemical polymerization were measured. The results are shown in Table 3.

TABLE 1

| Composition | (B) Photopolymerization initiator component | | | | (C) Chemical polymerization initiator component | |
|---|---|---|---|---|---|---|
| | b1) α-Diketone compound | b2) Aliphatic tertiary amine of one electroattracting saturated aliphatic group-bonded type | b3) s-Triazine compound | b3) Aryliodonium salt compound | c2) N,N-di (hydroxyalkyl-p-toluidine compound) | Others |
| PA-1 | | DMEM 0.5 | | | DEPT 1.4 | |
| PA-2 | | DMEM 0.5 | | | DEPT 1.4 | DMBE 0.8 |
| PA-3 | CQ 0.8 | DMEM 0.5 | | | DEPT 1.4 | DMBE 0.8 |
| PA-4 | | DMEOA 0.5 | | | DEPT 1.4 | DMBE 0.8 |
| PA-5 | | DEEOA 0.5 | | | DEPT 1.4 | DMBE 0.8 |
| PA-6 | | | | | DEPT 1.4 | DMBE 0.8 |
| PA-7 | | DMEM 0.5 | | | | DMBE 0.8 |
| PA-8 | | DMEM 0.5 | TCT 0.3 | | DEPT 1.4 | DMBE 0.8 |
| PA-9 | | | | | DEPT 1.4 | BA 0.5 |
| PA-10 | | | | | DEPT 1.4 | DMBE 0.8 MDEOA 0.5 |
| PA-11 | | DMEM 0.5 | | | DPPT 1.4 | DMBE 0.8 |
| PA-12 | | DMPM 0.5 | | | DEPT 1.4 | DMBE 0.8 |
| PA-13 | | DMEM 0.5 | | | | DMBE 0.8 DMPT 1.4 |
| PA-14 | | DMEM 0.5 | | IPDPI 0.3 | DEPT 1.4 | DMBE 0.8 |

TABLE 2

| Composition | (B) Photopolymerization initiator component (g) | | | (C) Chemical polymerization initiator component (g) | |
|---|---|---|---|---|---|
| | b1) α-Diketone compound | b3) s-Triazine compound | b3) Aryliodonium salt compound | c1) Organic peroxide | c2) N,N-di(hydroxyalkyl-p-toluidine compound) |
| PB-1 | CQ 0.8 | TCT 0.3 | | BPO 3.3 | |
| PB-2 | | TCT 0.3 | | BPO 3.3 | |
| PB-3 | CQ 0.8 | CBCT 0.3 | | BPO 3.3 | |
| PB-4 | CQ 0.8 | PBCT 0.3 | | BPO 3.3 | |
| PB-5 | CQ 0.8 | | | BPO 3.3 | |
| PB-6 | CQ 0.8 | TCT 0.3 | | | |
| PB-7 | CQ 0.8 | TCT 0.3 | | BPO 3.3 | DEPT 1.4 |
| PB-8 | CQ 0.8 | | IPDPI 0.3 | BPO 3.3 | |
| PB-9 | CQ 0.8 | | DPI 0.3 | BPO 3.3 | |

TABLE 3

| | Composition A | Composition B | Surface hardness (Hv) Right after production | Surface hardness (Hv) After 1 week at 37° C. | Curing characteristic | |
|---|---|---|---|---|---|---|
| Example 1 | PA-1 | PB-1 | 40 | 45 | 3.0 | 4.6 |
| Example 2 | PA-2 | PB-1 | 60 | 58 | 3.0 | 4.5 |
| Example 3 | PA-3 | PB-2 | 59 | 56 | 3.0 | 4.5 |
| Example 4 | PA-4 | PB-1 | 44 | 43 | 3.0 | 4.5 |
| Example 5 | PA-5 | PB-1 | 42 | 40 | 3.0 | 4.5 |
| Example 6 | PA-2 | PB-3 | 56 | 54 | 3.0 | 4.5 |
| Example 7 | PA-2 | PB-4 | 51 | 50 | 3.0 | 4.5 |
| Example 8 | PA-11 | PB-1 | 58 | 55 | 4.0 | 6.0 |
| Example 9 | PA-12 | PB-1 | 50 | 49 | 3.0 | 4.5 |
| Example 10 | PA-2 | PB-8 | 55 | 52 | 3.0 | 4.5 |
| Example 11 | PA-2 | PB-9 | 50 | 48 | 3.0 | 4.5 |
| Comp. Example 1 | PA-2 | PB-2 | Unmeasurable due to non-curing | Unmeasurable due to non-curing | 3.0 | 4.5 |
| Comp. Example 2 | PA-6 | PB-1 | 6 | 6 | 3.0 | 4.5 |
| Comp. Example 3 | PA-2 | PB-5 | 9 | 8 | 3.0 | 4.5 |

TABLE 3-continued

|  | Composition A | Composition B | Surface hardness (Hv) | | Curing characteristic | |
|---|---|---|---|---|---|---|
|  |  |  | Right after production | After 1 week at 37° C. | | |
| Comp. Example 4 | PA-2 | PB-6 | 59 | 58 | Unmeasurable due to non-curing | Unmeasurable due to non-curing |
| Comp. Example 5 | PA-7 | PB-1 | 63 | 61 | Unmeasurable due to non-curing | Unmeasurable due to non-curing |
| Comp. Example 6 | PA-8 | PB-5 | 56 | 18 | 3.0 | 4.4 |
| Comp. Example 7 | PA-7 | PB-7 | PB-7 cured during production and unmeasurable | | | |
| Comp. Example 8 | PA-9 | PB-1 | Unmeasurable due to non-curing | Unmeasurable due to non-curing | 3.0 | 4.4 |
| Comp. Example 9 | PA-10 | PB-1 | 16 | 15 | 3.0 | 4.4 |
| Comp. Example 10 | PA-13 | PB-1 | 62 | 58 | 1.5 | 4.3 |
| Comp. Example 11 | PA-14 | PB-5 | 54 | 19 | 3.0 | 4.5 |
| Comp. Example 12 | PA-10 | PB-8 | 17 | 15 | 3.0 | 4.4 |

As a result, the same good results as in Example 1 were obtained in Examples 2 to 11.

Comparative Example 1 is a case in which the composition contained no CQ. Since there was no photopolymerization, the surface hardness measurement for the cured material by photopolymerization was impossible.

Comparative Example 2 is a case containing no aliphatic tertiary amine of one electroattracting saturated aliphatic group-bonded type. The surface hardness of the cured material by photopolymerization was Hv 6 right after production and Hv 6 after 1 week at 37° C, which were both low.

Comparative Example 3 is a case of a composition containing neither s-triazine compound having a trihalomethyl group as a substituent nor diaryliodonium salt. The surface hardness of the cured material by photopolymerization was Hv 9 right after production and Hv 8 after 1 week at 37° C, which were both low.

A Comparative Example 4 is a case of a composition containing no organic peroxide. Since there was no chemical polymerization, the evaluation of the curing characteristic in chemical polymerization was impossible.

Comparative Example 5 is a case of a composition containing no N,N-di(hydroxyalkyl)-p-toluidine compound. Since there was no chemical curing, the evaluation of the curing characteristic in chemical polymerization was impossible.

Comparative Examples 6 and 11 are each a case in which an aliphatic tertiary amine of one electroattracting saturated aliphatic group-bonded type and a s-triazine compound having a trihalomethyl group as a substituent or a diaryliodonium salt compound were present in the same one package. The surface hardnesses of the cured materials by photopolymerization was HV 56 or 54 right after production but dropped to 18 or 19 after 1 week at 37° C.

Comparative Example 7 is a case in which it was tried to pack an organic peroxide and an N,N-di(hydroxyalkyl)-p-toluidine compound in the same one package. However, the package, i.e. the composition PB-7 cured during the production; therefore, the evaluation of cured material was impossible.

Comparative Example 8 is a case using, instead of an aliphatic tertiary amine of one electroattracting saturated aliphatic group-bonded type, BA, i.e. an aliphatic tertiary amine of electroattracting saturated aliphatic group-non-bonded type. Since there was no photopolymerization, the surface hardness measurement for the cured material by photopolymerization was impossible.

Comparative Examples 9 and 12 are each a case using, instead of an aliphatic tertiary amine of one electroattracting saturated aliphatic group-bonded type, MDEOA, i.e. an aliphatic tertiary amine of two electroattracting saturated aliphatic groups-bonded type. The surface hardness of the cured material by photopolymerization was only HV 16 or HV 17 right after production. Comparative Example 10 is a case of using, instead of an N,N-dihyroxyalkyl-p-toluidine compound, DMPT, i.e. an N,N-alkyl-p-toluidine compound. In the measurement of the curing characteristic in chemical polymerization, the curing time was about the same as in Example 2, but the curing starting time was only 1.5 minutes.

Example 12

(Preparation of Cement Composition)

30 g of Bis-GMA, 30 g of 3G and 40 g of D-2.6E were weighed. Thereto were added 0.5 g of DMEM and 1.4 g of DEPT to prepare a matrix liquid A. 30 g of the matrix liquid A was mixed with 40 g of Indeterminate form silica-zirconia, 29 g of spherical silica-zirconia and 1 g of fine powder silica in a mortar to prepare a paste composition CA-1.

30 g of Bis-GMA, 30 g of 3G and 40 g of D-2.6E were weighed. Thereto were added 0.8 g of CQ, 0.3 g of TCT and 3.3 g of BPO to prepare a matrix liquid B. 30 g of the matrix liquid B was mixed with 40 g of Indeterminate form silica-zirconia, 29 g of spherical silica-zirconia and 1 g of fine powder silica in a mortar to prepare a paste composition CB-1.

The two pastes were filled in a double syringe (SDL X10-01-52, a product of Mixpac) and the double syringe was set in a dispenser (DL 10-01-00, a product of Mixpac). At the front end of the double syringe were fitted a mixing tip (ML 2.5-08-D, a product of Mixpac) and a front nozzle (IOR 209-20, a product of Mixpac), and the two pastes were subjected to automatic mixing and the mixed paste was filled into a mold. Right after the filling, the paste was irradiated with a light to cure the paste. The cured material formed by photopolymerization was measured for surface hardness, which was Hv 38. Also, the double syringe filled with the pastes was stored at 37° C. for 1 week and then the same measurement was made, showing Hv 36. Separately, the curing characteristic in chemical polymerization was measured, indicating a curing starting time of 3.0 minutes and a curing time of 4.6 minutes.

(Preparation of Pretreatment Agent)

30 g of PM2, 20 g of Bis-GMA, 50 g of acetone, 5 g of water and 0.1 g of BMOV were mixed to prepare a composition (I). 20 g of Bis-GMA, 10 g of 3G, 20 g of HEMA, 1 g of POH and 2 g of PhBTEOA were mixed to prepare a composition (II).

(Evaluation of Bond Strength)

There was used, as a pretreatment agent, a 1:1 mixture of the composition (I) and the composition (II). There was used, as a cement composition, a 1:1 mixture of (CA-1) and (CB-1). Using these, the bond strength in chemical polymerization or photopolymerization was measured. The results were as follows.

Bond Strength to Dentin in Chemical Polymerization
15.6 MPa
Bond Strength to Enamel in Chemical Polymerization
16.3 MPa
Bond Strength to Dentin in Photopolymerization
15.1 MPa
Bond Strength to Enamel in Photopolymerization
15.3 MPa Examples 13 to 22 and Comparative Examples 13 to 18

Each two kinds of compositions were prepared in the same manner as in Example 12 except that the compositions used components and amounts used were shown in Table 4 and Table 5. The surface hardness of each cured material formed by photopolymerization, the curing characteristic in chemical polymerization and the tensile bond strength in photopolymerization or chemical polymerization were measured. The results are shown in Table 6.

TABLE 4

| | (g) | | | | |
|---|---|---|---|---|---|
| Composition | b2) Aliphatic tertiary amine of one electroattracting saturated aliphatic group-bonded type | b3) s-Triazine compound | b3) Aryliodonium salt compound | (C) Chemical polymerization initiator component (g) c2) N,N-di(hydroxyalkyl-p-toluidine compound) | Others (g) |
| CA-1 | DMEM 0.5 | | | DEPT 1.4 | DMBE 0.8 |
| CA-2 | DMEM 0.5 | | | DEPT 1.4 | DMBE 0.8 |
| CA-3 | DMEOA 0.5 | | | DEPT 1.4 | DMBE 0.8 |
| CA-4 | DMEOA 0.5 | | | DEPT 1.4 | DMBE 0.8 |
| CA-5 | | | | DEPT 1.4 | DMBE 0.8 |
| CA-6 | DMEM 0.5 | | | | DMBE 0.8 |
| CA-7 | DMEM 0.5 | TCT 0.3 | | DEPT 1.4 | DMBE 0.8 |
| CA-8 | | | | DEPT 1.4 | DMBE 0.8 MDEOA 0.5 |
| CA-9 | DMEM 0.5 | | | DPPT 1.4 | DMBE 0.8 |
| CA-10 | DMPM 0.5 | | | DEPT 1.4 | DMBE 0.8 |
| CA-11 | DMEM 0.5 | | | | DMBE 0.8 DMPT 1.4 |
| CA-12 | DMEM 0.5 | | IPDPI 0.3 | DEPT 1.4 | DMBE 0.8 |

TABLE 5

| | (B) Photopolymerization initiator component (g) | | | (C) Chemical polymerization initiator component (g) | |
|---|---|---|---|---|---|
| Composition | b1) α-Diketone compound | b3) s-Triazine compound | b3) Aryliodonium salt compound | c1) Organic peroxide | c2) N,N-di(hydroxyalkyl-p-toluidine compound) |
| CB-1 | CQ 0.8 | TCP 0.3 | | BPO 3.3 | |
| CB-2 | CQ 0.8 | CBCT 0.3 | | BPO 3.3 | |
| CB-3 | CQ 0.8 | PBCT 0.3 | | BPO 3.3 | |
| CB-4 | CQ 0.8 | | | BPO 3.3 | |
| CB-5 | CQ 0.8 | | IPDPI 0.3 | BPO 3.3 | |
| CB-6 | CQ 0.8 | | DPI 0.3 | BPO 3.3 | |

TABLE 6

| | Composition A | Composition B | Surface hardness Right after production | Surface hardness After 1 week at 37° C. | Curing characteristic Curing starting time (min.) | Curing characteristic Curing time (min.) | Bond strength (chemical polymerization) Dentin (MPa) | Bond strength (chemical polymerization) Enamel (MPa) | Bond strength (photopolymerization) Dentin (MPa) | Bond strength (photopolymerization) Enamel (MPa) |
|---|---|---|---|---|---|---|---|---|---|---|
| Example 12 | CA-1 | CB-1 | 38 | 36 | 3.0 | 4.6 | 15.6 | 16.3 | 15.1 | 15.3 |
| Example 13 | CA-2 | CB-1 | 49 | 47 | 3.0 | 4.5 | 15.7 | 16.1 | 17.2 | 17.1 |
| Example 14 | CA-3 | CB-1 | 44 | 42 | 3.0 | 4.5 | 15.4 | 15.9 | 16.9 | 16.7 |
| Example 15 | CA-4 | CB-1 | 45 | 44 | 3.0 | 4.5 | 15.7 | 14.1 | 16.5 | 16.8 |
| Example 16 | CA-9 | CB-1 | 48 | 47 | 3.0 | 6.0 | 15.1 | 14.9 | 16.2 | 16.7 |
| Example 17 | CA-10 | CB-1 | 46 | 45 | 3.0 | 4.5 | 15.5 | 15.1 | 16.4 | 16.1 |
| Example 18 | CA-12 | CB-1 | 48 | 47 | 3.0 | 4.5 | 15.8 | 15.5 | 16.4 | 16.3 |
| Example 19 | CA-2 | CB-2 | 48 | 47 | 3.0 | 4.5 | 15.9 | 15.9 | 16.3 | 15.9 |
| Example 20 | CA-2 | CB-3 | 46 | 44 | 3.0 | 4.5 | 15.5 | 15.3 | 15.9 | 16.1 |
| Example 21 | CA-2 | CB-5 | 49 | 48 | 3.0 | 4.5 | 15.7 | 15.8 | 17.3 | 17.0 |
| Example 22 | CA-2 | CB-6 | 47 | 45 | 3.0 | 4.5 | 15.6 | 15.7 | 16.2 | 16.3 |
| Comp. Example 13 | CA-5 | CB-1 | 5 | 5 | 3.0 | 4.5 | 15.2 | 14.9 | 1.6 | 2.2 |
| Comp. Example 14 | CA-6 | CB-1 | 44 | 42 | —*) | —*) | —*) | —*) | 13.1 | 12.8 |
| Comp. Example 15 | CA-7 | CB-4 | 42 | 12 | 3.0 | 4.5 | 15.1 | 14.9 | 13.8 | 13.3 |
| Comp. Example 16 | CA-12 | CB-4 | 43 | 13 | 3.0 | 4.5 | 15.5 | 14.2 | 13.9 | 14.1 |
| Comp. Example 17 | CA-2 | CB-4 | 15 | 13 | 3.0 | 4.5 | 15.7 | 15.1 | 4.1 | 4.2 |
| Comp. Example 18 | CA-8 | CB-1 | 7 | 6 | 3.0 | 4.5 | 15.4 | 14.8 | 2.5 | 3.2 |
| Comp. Example 19 | CA-11 | CB-1 | 43 | 41 | 1.5 | 4.5 | 15.3 | 15.9 | 15.9 | 16.4 |

*)No curing and unmeasurable.

As a result, the same good results as in Example 1 were obtained in Examples 13 to 22.

Meanwhile, Comparative Example 13 is a case containing no aliphatic tertiary amine of one electroattracting saturated aliphatic group-bonded type. The surface hardness of the cured material by photopolymerization was Hv 5 right after production and Hv 5 after 1 week at 37° C, which were both low. Further, the bond strength in photopolymerization was 1.6 MPa to dentin and 2.2 MPa to enamel, which were both low.

Comparative Example 14 is a case of a composition containing no N,N-di(hydroxyalkyl)-p-toluidine compound. Since there was no chemical polymerization, the evaluation of curing characteristic and bond strength in chemical polymerization was impossible.

Comparative Examples 15 and 16 are each a case in which an aliphatic tertiary amine of one electroattracting saturated aliphatic group-substituted type and a s-triazine compound having a trihalomethyl group as a substituent or a diaryliodonium salt compound were present in the same one package. The surface hardnesses of the cured materials by photopolymerization was HV 42 or 43 right after production but dropped to 12 or 13 after 1 week at 37° C.

Comparative Example 17 is a case of a composition containing neither s-triazine compound having a trihalomethyl group as a substituent nor diaryliodonium salt. The surface hardness of the cured material by photopolymerization was Hv 15 right after production and Hv 13 after 1 week at 37° C, which were both low. Further, the bond strength in photopolymerization was 4.1 MPa to dentin and 4.2 MPa to enamel, which were both low.

Comparative Example 18 is a case using, instead of an aliphatic tertiary amine of one electroattracting saturated aliphatic group-bonded type, MDEOA, i.e. an aliphatic tertiary amine of two electroattracting saturated aliphatic groups-bonded type. The surface hardness of the cured material by photopolymerization was Hv 7 right after production and Hv 6 after 1 week at 37° C, which were both low. Further, the bond strength in photopolymerization was 2.5 MPa to dentin and 3.2 MPa to enamel, which were both low.

Comparative Example 19 is a case of using, instead of an N,N-dihyroxyalkyl-p-toluidine compound, DMPT, i.e. an N,N-alkyl-p-toluidine compound. In the measurement of the curing characteristic in chemical polymerization, the curing time was about the same as in Example 12, but the curing starting time was only 1.5 minutes.

The invention claimed is:

1. A dual-cure curable material kit comprising
(A) a radical-polymerizable monomer component,
(B) a photopolymerization initiator component comprising (b1) an α-diketone compound, (b2) an aliphatic tertiary amine compound having a tertiary amino group in which three saturated aliphatic groups bond to the nitrogen atom and one of the saturated aliphatic groups has an electroattracting group as a substituent, and (b3) 2, 4, 6-tris(trichloromethyl)-s-triazine, and
(C) a chemical polymerization initiator component comprising (c1) an organic peroxide and (c2) an N,N-di(hydroxyalkyl)-p-toluidine compound, which is packed in at least two different packages so that the component (b2) and the component (b3) both of the photopolymerization initiator component are not present together in a single package and the component (c1) and the component (c2) both of the chemical polymerization initiator component are not present together in a single package.

2. The dual-cure curable material kit according to claim 1, wherein the component (b2) is a tertiary amine compound represented by the following general formula (1)

[formula 1]

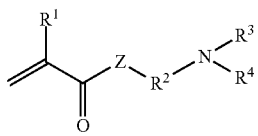

(1)

wherein Z is an oxygen atom or an NH group; $R^1$ is a hydrogen atom or a methyl group;

$R^2$ is an alkylene group; and $R^3$ and $R^4$ are each independently an alkyl group of 1 to 6 carbon atoms.

3. The dual-cure curable material kit according to claim 1, which has a form of the following two different packages:
   (I) a package containing at least the component (b2) of the photopolymerization initiator component (B) and the component (c2) of the chemical polymerization initiator component (C), and
   (II) a package containing at least the component (b3) of the photopolymerization initiator component (B) and the component (c1) of the chemical polymerization initiator component (C).

4. The dual-cure curable material kit according to claim 1, which has a form of the following two different packages:
   (I) a package containing at least the radical-polymerizable monomer component (A), the component (b2) of the photopolymerization initiator component (B) and the component (c2) of the chemical polymerization initiator component (C), and
   (II) a package containing at least the radical-polymerizable monomer component (A), the component (b3) of the photopolymerization initiator component (B) and the component (c1) of the chemical polymerization initiator component (C).

5. The dual-cure curable material kit according to claim 1, wherein the radical-polymerizable monomer component (A) is a polyfunctional radical-polymerizable monomer.

6. The dual-cure curable material kit according to claim 5, wherein the polyfunctional radical-polymerizable monomer is a (meth)acrylate type polyfunctional radical-polymerizable monomer.

7. The dual-cure curable material kit according to claim 1, wherein the α-diketone compound (b1) is camphorquinone.

\* \* \* \* \*